United States Patent
Thompson et al.

(10) Patent No.: US 10,322,497 B2
(45) Date of Patent: Jun. 18, 2019

(54) BIAS MEMBER FOR REDUCING RATCHETING ARC

(71) Applicant: Snap-on Incorporated, Kenosha, WI (US)

(72) Inventors: Christopher D Thompson, Franklin, WI (US); Daniel M Eggert, Kenosha, WI (US); David T Ross, Beach Park, IL (US)

(73) Assignee: Snap-on Incorporated, Kenosha, WI (US)

( * ) Notice: Subject to any disclaimer, the term of this patent is extended or adjusted under 35 U.S.C. 154(b) by 693 days.

(21) Appl. No.: 14/698,358

(22) Filed: Apr. 28, 2015

(65) Prior Publication Data

US 2015/0328751 A1 Nov. 19, 2015

Related U.S. Application Data

(60) Provisional application No. 61/993,850, filed on May 15, 2014.

(51) Int. Cl.
| | | |
|---|---|---|
| *B25B 13/04* | (2006.01) | |
| *B25B 13/46* | (2006.01) | |
| *B25B 13/08* | (2006.01) | |
| *F16D 41/16* | (2006.01) | |

(52) U.S. Cl.
CPC ............ *B25B 13/463* (2013.01); *B25B 13/04* (2013.01); *B25B 13/08* (2013.01); *F16D 41/16* (2013.01)

(58) Field of Classification Search
CPC ... B25B 13/463; B25B 13/462; B25B 13/466; B25B 13/465; F16D 14/16
USPC .......................................... 81/63.1, 62, 63.2
See application file for complete search history.

(56) References Cited

U.S. PATENT DOCUMENTS

| | | | |
|---|---|---|---|
| 4,290,328 A | 9/1981 | Clark | |
| 6,457,387 B1 | 10/2002 | Hu | |
| 6,568,299 B2 | 5/2003 | Hu | |
| 6,691,594 B2 | 2/2004 | Chen | |

(Continued)

FOREIGN PATENT DOCUMENTS

| | | | |
|---|---|---|---|
| CN | 101293340 A | 10/2008 | |
| CN | 101293340 A | 10/2008 | |

(Continued)

OTHER PUBLICATIONS

State Intellectual Property Office of P.R. China, The First Office Action, dated May 26, 2016; 12pages.

(Continued)

*Primary Examiner* — Joseph J Hail
*Assistant Examiner* — Arman Milanian
(74) *Attorney, Agent, or Firm* — Seyfarth Shaw LLP

(57) ABSTRACT

A tool that broadly includes a first drive end and a ratchet gear disposed in the first drive end. The ratchet gear includes a receiving portion adapted to engage a work piece for providing torque to the working piece. First and second pawls each including pawl teeth are selectively engageable with the ratchet gear. The first and second pawls each include a relief portion on a side opposite the pawl teeth. A first bias member is engaged with the relief portions and limits movement of the first and second pawls away from the ratchet gear during use of the tool, thereby reducing an amount of ratcheting arc of the tool.

15 Claims, 10 Drawing Sheets

(56) References Cited

U.S. PATENT DOCUMENTS

| | | | |
|---|---|---|---|
| 6,789,449 B2* | 9/2004 | Liu | B25B 13/463 192/43 |
| 6,955,104 B2 | 10/2005 | Hu | |
| 6,971,285 B2* | 12/2005 | Chen | B25B 13/463 81/177.85 |
| 6,981,434 B2* | 1/2006 | Chen | B25B 13/463 192/43.1 |
| 7,111,527 B1* | 9/2006 | Lee | B25B 13/463 81/58.1 |
| 7,143,669 B2 | 12/2006 | Hu | |
| 7,185,566 B2 | 3/2007 | Arnold et al. | |
| 7,299,720 B1* | 11/2007 | Schultz | B25B 13/463 81/62 |
| 7,661,337 B2 | 2/2010 | Chen | |
| 7,802,498 B2* | 9/2010 | Hu | B25B 13/463 81/63.1 |
| 7,827,886 B2* | 11/2010 | Hu | B25B 13/463 192/43.2 |
| 7,987,747 B2* | 8/2011 | Ross | B25B 13/463 81/62 |
| RE42,768 E | 10/2011 | Huang | |
| 8,210,073 B2 | 7/2012 | Hu | |
| 8,245,602 B2* | 8/2012 | Chan | B25B 13/463 81/60 |
| 8,250,947 B2 | 8/2012 | Hu | |
| 8,297,152 B2 | 10/2012 | Hu | |
| 8,683,894 B1 | 4/2014 | Chen | |
| 8,776,640 B2* | 7/2014 | Hu | B25B 13/463 81/60 |
| 2004/0016322 A1 | 1/2004 | Hu | |
| 2004/0055423 A1 | 3/2004 | Hu | |
| 2004/0261584 A1* | 12/2004 | Huang | B25B 13/463 81/63.1 |
| 2005/0092136 A1* | 5/2005 | Chen | B25B 13/463 81/63.1 |
| 2006/0065078 A1* | 3/2006 | Chen | B25B 13/463 81/60 |
| 2006/0117913 A1* | 6/2006 | Chen | B25B 13/463 81/63.1 |
| 2006/0130615 A1* | 6/2006 | Arnold | B25B 13/463 81/63.2 |
| 2008/0229887 A1* | 9/2008 | Thompson | B25B 13/463 81/62 |
| 2008/0245194 A1* | 10/2008 | Ross | B25B 13/463 81/63.1 |
| 2011/0132149 A1* | 6/2011 | Lee | B25B 13/463 81/63.1 |
| 2013/0283982 A1* | 10/2013 | Hopper | B25B 13/463 81/63.1 |

FOREIGN PATENT DOCUMENTS

| | | |
|---|---|---|
| CN | 101678436 A | 3/2010 |
| CN | 101678536 A | 3/2010 |
| DE | 202013103841 | 9/2013 |
| TW | 200914210 | 4/2009 |
| WO | 2008115771 A | 9/2008 |

OTHER PUBLICATIONS

Australian Patent Examination Report No. 1, dated Jan. 29, 2016; 5 pages.
UK Intellectual Property Office, Examiner's Report dated Dec. 8, 2016; 29 pages.
Canadian Office Action for Application No. 2,890,975 dated May 5, 2017, 4 pages.
Canadian Intellectual Property Office, Examiner's Report dated Sep. 2, 2016; 5 pages.
Taiwan Office Action for Application No. 104115499, dated Aug. 31, 2017, 11 pages.
Australian Examination Report for Application No. 2016277550 dated Feb. 1, 2018, 4 pages.
Chinese Office Action for Application No. 201510244797.4 dated Jun. 28, 2017, 8 pages.
Chinese Office Action for Application No. 201510244796.X dated Sep. 11, 2017, 9 pages.
Chinese Office Action for Application No. 201510244797.4 dated Dec. 27, 2017, 7 pages.
Taiwan Office Action for Application No. 104115499 dated Apr. 9, 2018, 9 pages.

* cited by examiner

BIAS MEMBER FOR REDUCING RATCHETING ARC

CROSS REFERENCES TO RELATED APPLICATIONS

The present application claims the benefit of U.S. Provisional Patent Application Ser. No. 61/993,850, filed May 15, 2014, entitled Low Profile Ratchet Wrench, the contents of which is incorporated herein by reference in its entirety.

FIELD

The present invention relates generally to ratchet mechanisms. More particularly, the present invention relates to improved ratchet wrench devices and methods.

BACKGROUND

Reversible ratchet mechanisms, such as ratchet wrenches, are well-known and used. Typically there is a drive portion engageable with a work piece, for example, a bolt head. In general, a first rotational drive direction may be selected for the ratchet mechanism so that use of the tool applies torque when engaged with the bolt head and rotated in a first direction, while slipping or ratcheting when rotated in an opposing, second direction. A second rotational drive direction may be selected for the ratchet mechanism that is opposite the first drive direction, which then provides torque in the second direction, while slipping or ratcheting when rotated in the opposite first direction.

Conventional ratchet wrenches tend to have a ratcheting arc, i.e., a number of degrees the ratchet wrench head must to be rotated to provide the ratcheting function, such as between "clicks," that can be quite large. This can be undesirable in low clearance and tight space situations where the available angle to rotate the tool head is relatively small. Often times, the available angle is so small that required arc travel for the ratchet is greater than the available angle, wherein the ratchet mechanism does not allow the tool to provide the requisite slip or ratcheting action.

SUMMARY

The present invention broadly includes a means to limit pawl travel during ratcheting operations. A bias member, such as a leaf spring, is disposed around an edge of the pawls to limit travel of the pawls away from the ratchet gear, thereby reducing an amount of ratcheting arc of the torque application/ratcheting operation.

The present invention relates to a tool, such as a ratchet wrench. In an embodiment, the tool includes a first drive end and a ratchet gear disposed in the first drive end. The ratchet gear includes a receiving portion adapted to engage a workpiece for providing torque to the working piece. First and second pawls each including pawl teeth are selectively engageable with the ratchet gear and include relief portions on a side opposite the pawl teeth. A first bias member is engaged with the relief portions of the first and second pawls and limits movement of the first and second pawls away from the ratchet gear during use of the tool.

In another embodiment, a ratchet tool is disclosed that includes a drive end having an aperture, and a first cavity in communication with the aperture. A ratchet gear is disposed in the aperture and includes a receiving portion, an engagement surface surrounding the receiving portion and adapted to operatively engage a working piece, and a plurality of ratchet teeth on an outer circumferential surface of the ratchet gear. First and second pawls are disposed in the first cavity. The first and second pawls each include pawl teeth adapted to selectively engage the ratchet teeth, and a first bias member is disposed in the first cavity and limits movement of the first and second pawls away from the ratchet gear during use of the ratchet tool.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION

Figure 1:
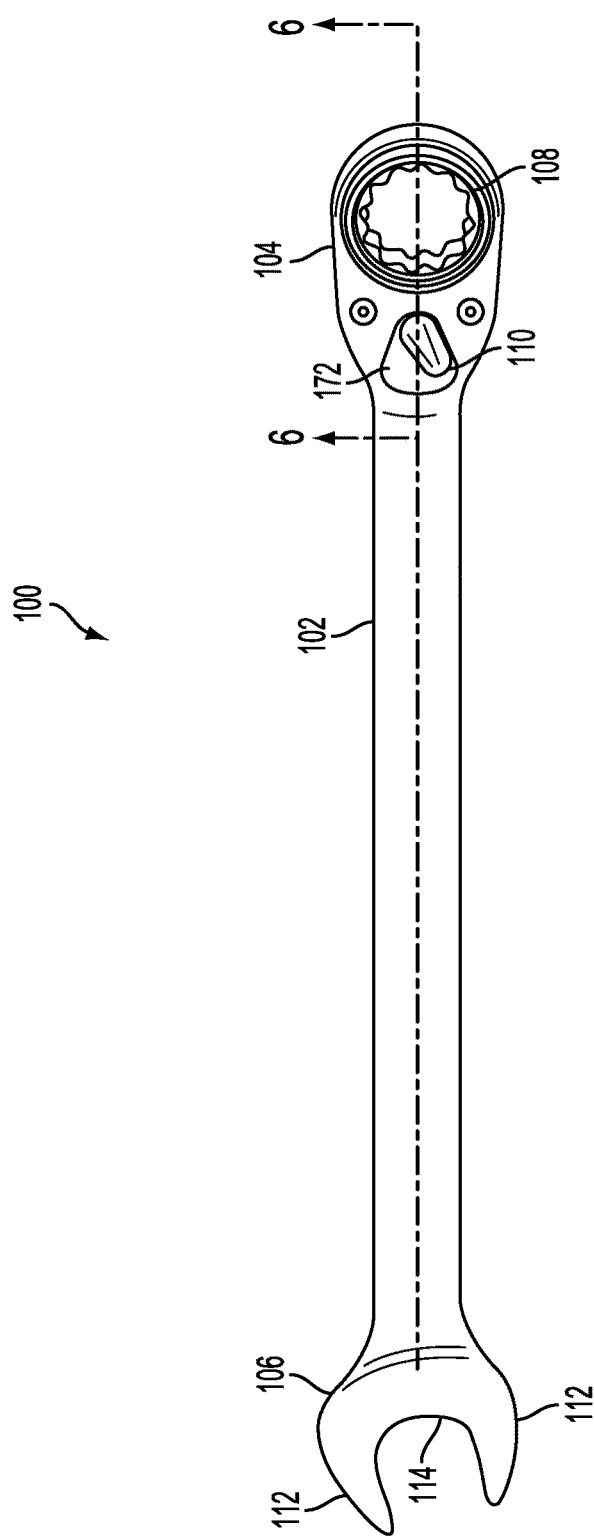
FIG. 1 is a plan view of a ratchet wrench according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a tool, such as a low-profile ratchet wrench. The ratchet wrench includes a means to limit pawl travel during ratcheting operations. A bias member, such as a leaf spring, is disposed around an edge of each of the pawls to limit travel of the pawls away from the ratchet gear, thereby reducing an amount of ratcheting arc of the wrench/ratcheting operation.

In an embodiment, a tool 100 is described with reference to FIG. 1. The tool 100 includes a wrench body or handle 102, a first drive end 104 at a first end of the handle 102, and a second drive end 106 at a second end of the handle opposite the first end. Each of the first drive end 104 and the second drive end 106 are adapted to engage with a workpiece (not shown) for providing torque to the working piece, such as a head of a fastener or other tool. In another embodiment, the tool includes just first drive end 104.

The first drive end 104 is of a ratcheting type and includes a ratchet gear 108 and a reversing lever 110 allowing a user to selectively determine a torque direction. More specifically, the ratchet gear 108 is operatively engageable with a workpiece, for example, a bolt with a hexagonal head. When the reversing lever 110 is in a first position, torque drive is permitted with rotation of the ratchet gear 108 in a first rotational drive direction while slippage or ratcheting occurs with rotation of the ratchet gear 108 in a second rotational drive direction opposite the first. Conversely, when the reversing lever 110 is in a second position, torque drive is permitted with rotation of the ratchet gear 108 in the second drive direction while slippage or ratcheting occurs in the first drive direction.

The second drive end 106 is of an open-ended wrench type. As illustrated, the second drive end 106 includes arms 112 that form a receiving portion 114 adapted to releasably engage a workpiece, for example, a bolt with a hexagonal head, and to transmit torque from the tool 100 to the workpiece. It should be appreciated that while the present tool is depicted as having an open ended box wrench on one end and a ratchet wrench on the other end, other configurations of the present application can be used without departing from the spirit and scope of the present application, such as, for example, having ratchet wrenches on both the first and second ends of the handle 102.

Figure 2:
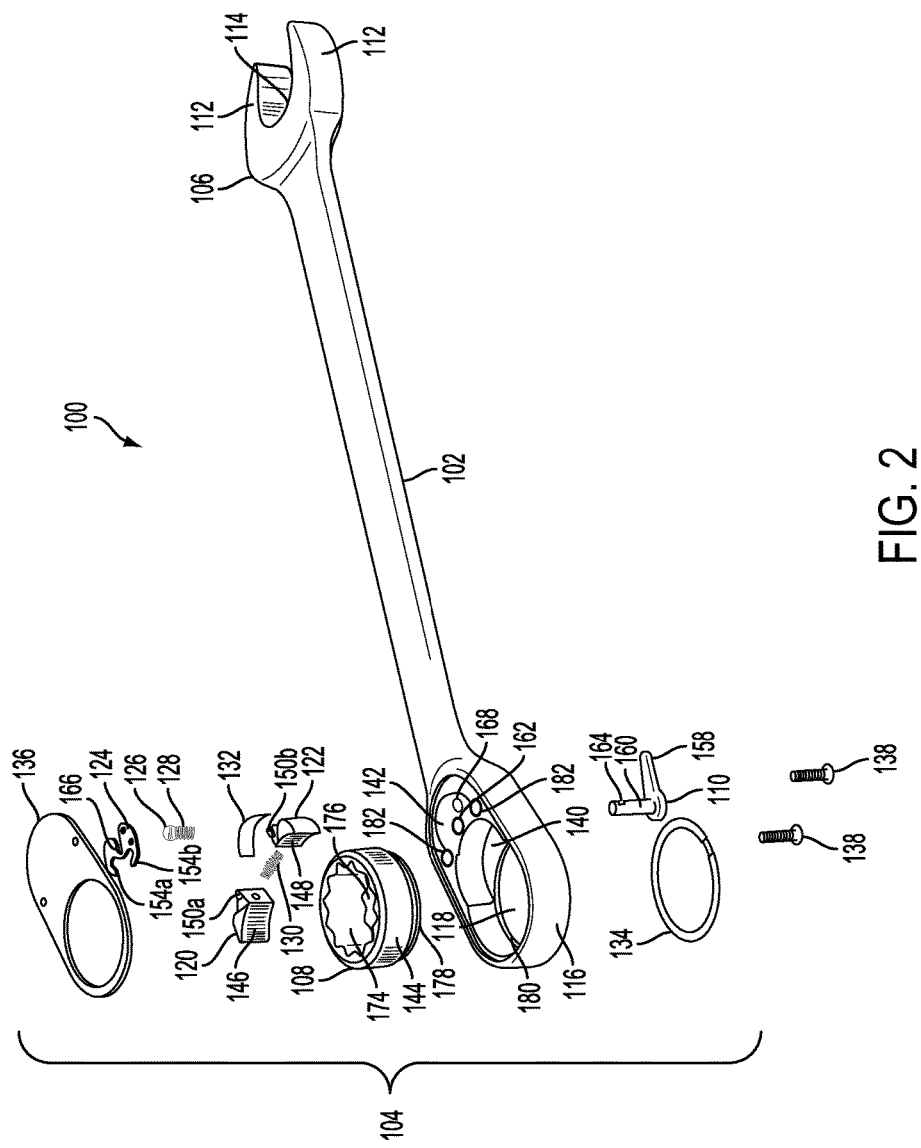
FIG. 2 is an exploded perspective view of the ratchet wrench of FIG. 1.

In an embodiment, the first drive end 104 is described in greater detail with reference to FIG. 2. Referring to FIG. 2, the first drive end 104 includes a head portion 116 including an aperture 118 and one or more cavities for receiving and retaining one or more components that, when assembled, form the first drive end 104. The components include, for example, pawls 120 and 122, a reversing disc 124, a ball 126 and spring 128, a first spring 130 and a second spring 132, the ratchet gear 108, the reversing lever 110, a retaining ring 134, and a cover plate 136 and fasteners 138.

Figure 3:
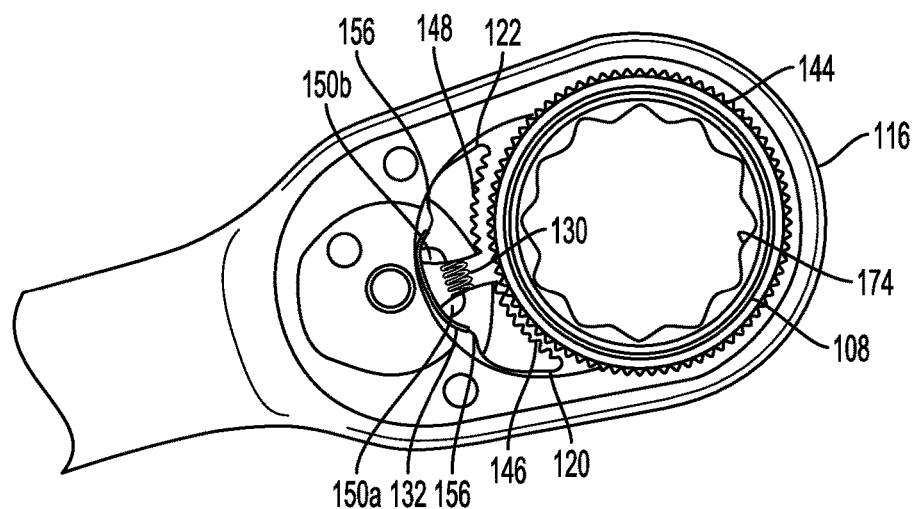
FIG. 3 is a first plan view of the ratchet wrench of FIG. 1, with a cover plate removed.

Referring to FIGS. 2 and 3, the head portion 116 includes the aperture 118, a first cavity 140 adjacent to and communicating with the aperture 116, and a second cavity 142 adjacent to and communicating with the first cavity 140. The pawls 120 and 122 are disposed in the first cavity 140 to allow the pawls 120 and 122 to selectively move into and out of engagement with the ratchet gearing or teeth 144 of the ratchet gear 108. The pawls 120 and 122 include teeth 146 and 148, respectively, adapted to matingly engage the ratchet gearing or teeth 144 of the ratchet gear 108 to allow torque to be applied in a selected direction. Each of the pawls 120 and 122 includes a post 150a, 150b adapted to engage with the reversing disc 124.

Figure 4:
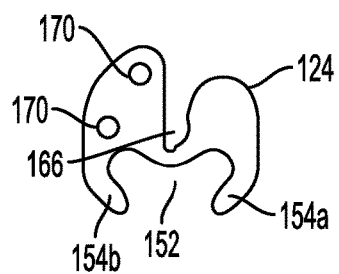
FIG. 4 is a top plan view of a reversing lever disc of the ratchet wrench of FIG. 1, removed from the wrench for illustration purposes.
Figure 5:
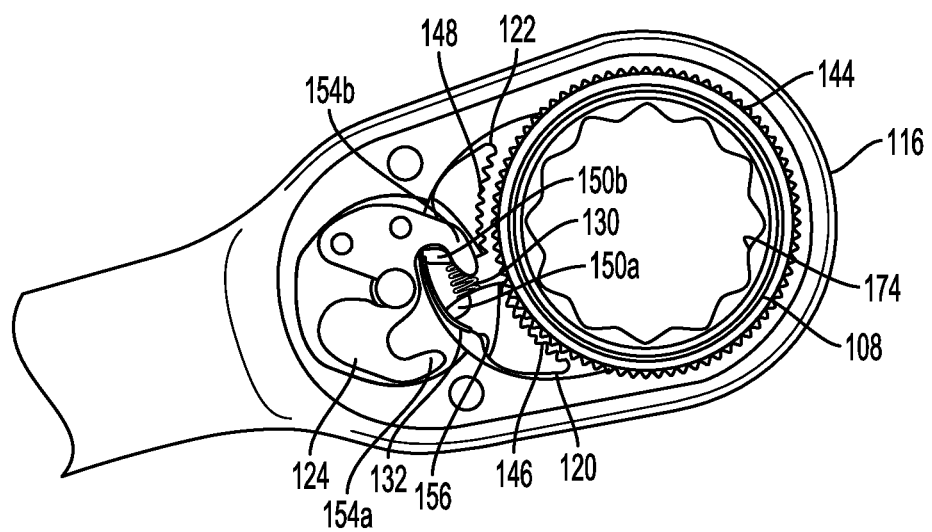
FIG. 5 is a second plan view of the ratchet wrench of FIG. 1, with the cover plate removed.

Referring to FIGS. 2 and 4-5, the reversing disc 124 is disposed in the second cavity 142. The second cavity 142 has a depth less than the first cavity 140, and is adjacent to and communicates with the first cavity 140 to allow the reversing disc 124 to interact with the pawls 120 and 122. Referring to FIGS. 2 and 4, the reversing disc 124 includes an arcuate opening 152 defining disc hooks 154a and 154b adapted to respectively engage the posts 150a and 150b. Referring to FIG. 5, as the reversing disc 124 is shifted to one position for a selected drive direction, a first hook 154b engages a first post 150b of, for example, the pawl 122, and continued rotation of the reversing disc 124 draws the pawl 122 away from and out of engagement with the ratchet gear 108. At the same time, a second hook 154a allows the post 150a to move through the opening 152 so that the pawl 120 shifts and becomes engaged with the ratchet gear 108.

Referring to FIGS. 2, 3 and 5, the posts 150a, 150b of the pawls 120 and 122 are proximate an opening of the first cavity 140 and oriented to face in a direction of the cover plate 136 or bottom of the head portion 116. This allows the depth of the second cavity 142 that receives the reversing disc 124 to be minimized, i.e. to be only deep enough to accommodate the reversing disc 124. Minimizing the depth of the second cavity 142 stiffens the head portion 116 improving the strength, rigidity, and the fatigue life of the tool 100.

A bias member, such as the first spring 130, may be disposed between the pawls 120 and 122. The ends of the first spring 130 are received and retained by a bore formed in a side of each pawl 120 and 122, the respective bores of the two pawls 120 and 122 being in an opposed orientation to allow the first spring 130 to bias the pawls 120 and 122 away from each other while also ensure that only one of the pawls 120 and 122 is in engagement with the ratchet gear 108 at one time. In this manner, when the reversing disc 124 engages a selector post 150a or 150b of one of the pawls 120 and 122 to move the pawl, the spring 130 causes the other pawl to shift position into engagement with the ratchet gear 108. Additionally, the spring 130 allows the pawl engaged with the ratchet gear 108 to cam or deflect away from the ratchet gear 108 when a first drive direction is selected but the ratchet tool is rotated in reverse, in an opposite direction, to allow slippage or ratcheting in that direction. The spring 130 then forces the pawl to return to engagement with the ratchet gear 108 when the reverse movement ceases.

A second bias member, such as the second spring 132, may also be provided as a means to limit pawl travel during ratcheting or use of the tool 100. Referring to FIGS. 2 and 3, the second spring 132 is disposed in the first cavity 140 and in engagement with relief portions 156 of the pawls 120 and 122. As illustrated in FIG. 3, the relief portions 156 are located on a side of the pawls 120 and 122 opposite the teeth 146 and 148, respectively. The second spring 132 biases the pawls 120 and 122 in a direction toward the ratchet gear 108 and restricts travel of the pawls 120 and 122 during a ratcheting operation. This also increases the minimum ratchet travel between loading.

Figure 6:
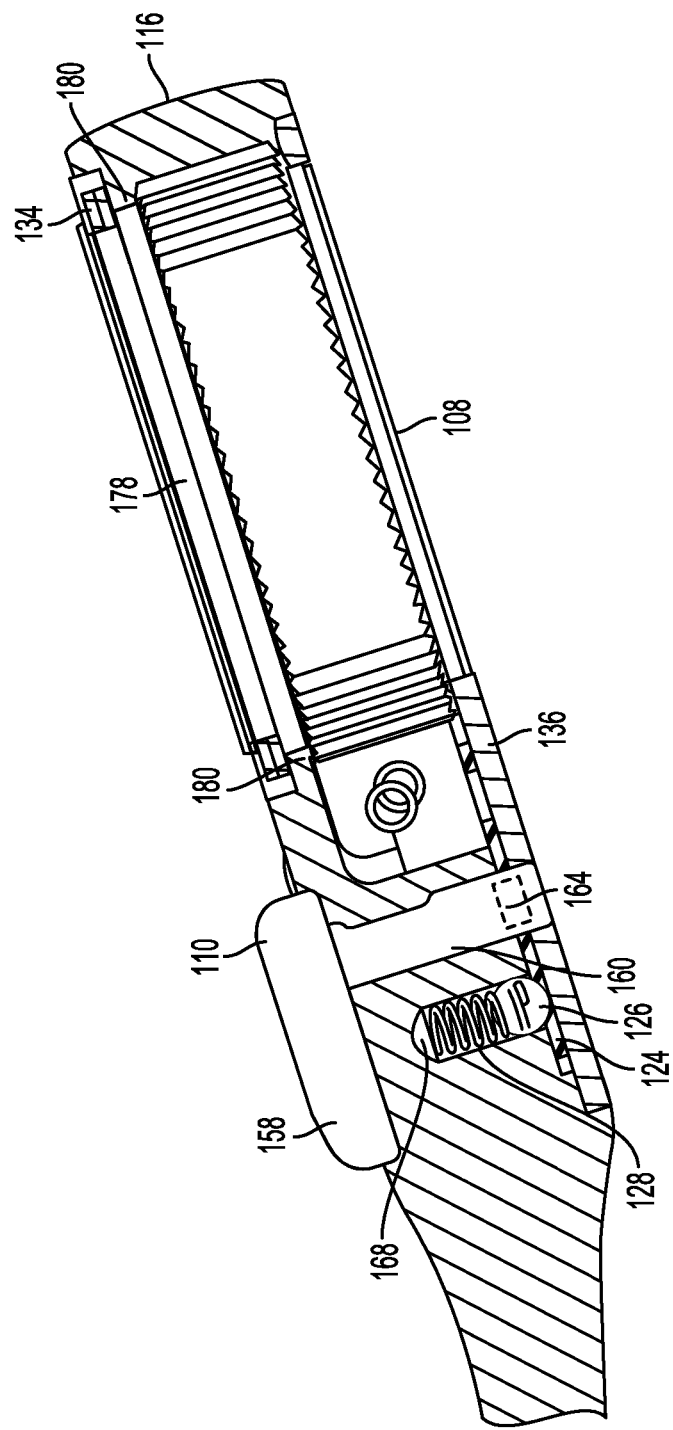
FIG. 6 is an enlarged, cross-sectional view of the ratchet wrench of FIG. 1, taken along line 6-6 of FIG. 1.

Referring to FIGS. 2 and 6, the reversing lever 110 and reversing disc 124 allow for selective engagement and dis-engagement of the pawls 120 and 122 with the ratchet gear 108. The reversing lever 110 includes a lever portion 158 and a stem portion 160. The stem portion 160 is received in a throughbore 162 provided in the head portion 116 with the lever portion 158 positioned on an outside of the head portion 116 for manual operation by a user to select a drive direction. The reversing lever 110 also includes a notch 164 in the stem portion 160 for receiving the reversing disc 124.

Referring to FIGS. 2 and 4, the reversing disc 124 has an irregular channel 166 allowing the reversing disc 124 to be slid into the notch 164 and rotated onto the stem portion 160. In this manner, the reversing lever 110 and the reversing disc 124 co-rotate when the reversing lever 110 is moved between positions for selecting the drive direction.

Referring to FIGS. 2 and 6, a ball and detent structure is provided to assist in holding the reversing disc 124 in place. In this aspect, a blind bore 168 is located in the second cavity 142. The spring 128 is disposed in the bore 168 and the ball 126 is disposed on the spring 128, proximate an opening of the bore 168. As illustrated in FIG. 4, the reversing disc 124 includes corresponding first and second detents or bores 170 on a side of the reversing disc 124 facing the second cavity 142. The detents 170 are positioned to correspond to the proper position for the ball 126 when the reversing lever 110 is in the proper position for the first and second drive directions, respectively. Referring to FIG. 6, as the reversing lever 110 is rotated out of a position for a drive direction, the ball 126 contacts an edge of one of the detents 170, thereby being deflected downward by compression of the spring 128. When the reversing lever 110 is shifted to the proper position for a drive direction, the ball 126 shifts into alignment with one of the detents 170, and the spring 128 biases the ball 126 into the detent 170.

Referring to FIG. 1, a stop mechanism is provided by structure formed on the tool 100 to limit overtravel or over rotation of the reversing lever 110. For example, a recess 172 is formed on an exterior of the tool 100. The recess 172 receives the lever portion 158 of the reversing lever 110. The recess 172 is shaped to prevent over rotation of the reversing lever 110 and the reversing disc 124. Rotation of the reversing lever 110, and thereby the reversing disc 124, to a first position for a first drive direction results in the reversing lever 110 contacting a first edge of the recess 172 (as illustrated in FIG. 1), and rotation of the reversing lever 110 from the first position to a second position for a second drive direction results in the reversing lever 110 contacting a second edge of the recess 172. The stop mechanism may also be provided by structure formed on the reversing disc and the cavity, as described below with reference to tool 200.

Referring to FIGS. 2 and 6, the ratchet gear 108 has a generally circular body portion with ratchet gearing or teeth 144 on an outer circumferential surface, and engagement surfaces 174 surrounding a receiving portion or receiving aperture 176 adapted to operatively engage a working piece, for example, a bolt with a hexagonal head. The ratchet gear 108 also includes a ring groove 178 proximal to an end of the ratchet gear and adapted to receive the retaining ring 134. The ratchet gear 108 is disposed in the aperture 118, with the ring groove 178 extending past a retaining web or shoulder 180 in the aperture 118 and the ratchet gearing or teeth 144 remaining in the aperture 118. In this aspect, the retaining web 180 and retaining ring 134 cooperatively hold the ratchet gear 108 in the aperture 118.

When traditional ratchet wrenches are loaded at an angle, other than perpendicular to an axis of rotation, the ratchet gear tends to tilt. This would cause a load to be applied to the cover plate of the wrench, which in turn applies a load on the retention screws holding the cover plate on the wrench and causing the retention screws to stress or fail. The tool 100 solves this problem by trapping the ratchet gear 108 with the retaining web 180 and retaining ring 134. The retaining web 180 and retaining ring 134 prevent the ratchet gear 108 from applying a load to the cover plate 136 and fasteners 138 during use.

Referring to FIG. 2, the tool 100 may be assembled by disposing the ratchet gear 108 in the aperture 118, with the ring groove 178 extending planarly beyond the retaining web 180. The retaining ring 134 is disposed in the ring groove 178 to hold the ratchet gear 108 in the aperture 118 and prevent the ratchet gear 108 from applying force to the cover plate 136 and fasteners 138 during use. The pawls 120 and 122 are disposed in the first cavity 140, with the teeth 146 and 148, respectively, facing in a direction of the ratchet gear 108. The spring 130 is disposed between the pawls 120 and 122 to bias the pawls 120 and 122 apart. The spring 130 may be disposed between the pawls 120 and 122 prior to or after disposing the pawls 120 and 122 in the first cavity 140. The second spring 132 is also disposed in the first cavity 140 and engaged with the relief portions 156 of the pawls 120 and 122 to limit pawl travel during ratcheting or use of the tool 100.

The reversing lever 110 is disposed in the throughbore 162, with the stem portion 160 and notch 164 extending into the second cavity 142 and the lever portion 158 remaining on an exterior surface of the tool 100 in the recess 172. The spring 128 and the ball 126 are inserted into the blind bore 168 in the second cavity 142, with the ball 126 proximate the opening of the blind bore 168. The reversing disc 124 is then positioned in the second cavity 142 and assembled onto the stem portion 160 by engaging the channel 166 with the notch 164 of the stem portion 160. The reversing disc 124 is rotated and a hook 154a or 154b is disposed around one of the pawl posts 150a or 150b. The cover plate 136 is then coupled on the tool 100 by inserting the fasteners 138 into fastener apertures 182 and coupling the fasteners 138 to the cover plate 136.

Figure 7:
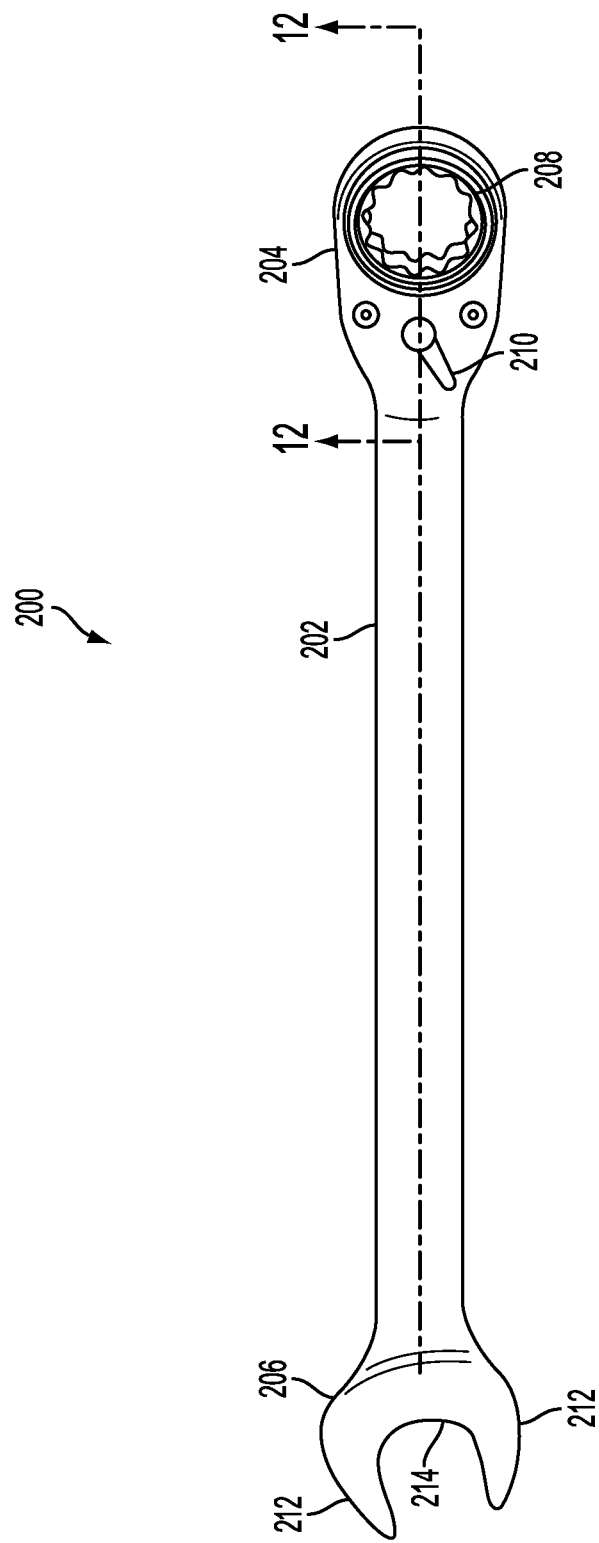
FIG. 7 is a plan view of a ratchet wrench according to another embodiment of the present invention.

In another embodiment, a tool 200 is described with reference to FIG. 7. The tool 200 is similar to the tool 100, described above, and operates and functions in a similar manner. For example, the tool 200 includes a wrench body or handle 202, a first drive end 204 at a first end of the handle 202, and a second drive end 206 at a second end of the handle. As described above with reference to the tool 100, the first drive end 204 and the second drive end 206 are similarly adapted to engage with a workpiece for providing torque to the working piece. In another embodiment, the tool 200 includes just first drive end 204.

The first drive end 204 is of a ratcheting type and includes a ratchet gear 208 and a reversing lever 210 allowing a user to selectively determine a torque direction. The ratchet gear 208 is operatively engageable with a workpiece. When the reversing lever 210 is in a first position, torque drive is permitted with rotation of the ratchet gear 208 in a first rotational drive direction while slippage or ratcheting occurs with rotation of the ratchet gear 208 in a second rotational drive direction opposite the first. Conversely, when the reversing lever 210 is in a second position, torque drive is permitted with rotation of the ratchet gear 208 in the second drive direction while slippage or ratcheting occurs in the first drive direction.

The second drive end 206 is of an open-ended wrench type and includes arms 212 that form a receiving portion 214 adapted to releasably engage a workpiece. However, it should be appreciated that other configurations of the present application can be used without departing from the spirit and scope of the present application, such as, for example, having ratchet wrenches on both the first and second ends of the handle 202.

In an embodiment, the first drive end 204 is described in greater detail with reference to FIG. 8. The first drive end 204 includes a head portion 216 including an aperture 218 and one or more cavities for receiving and retaining one or more components that, when assembled, form the first drive end 204. The components include, for example, pawls 220 and 222, a reversing disc 224, a ball 226 and spring 228, a first spring 230 and a second spring 232, the ratchet gear 208, the reversing lever 210, a retaining ring 234, and a cover plate 236 and fasteners 238.

Figure 8:
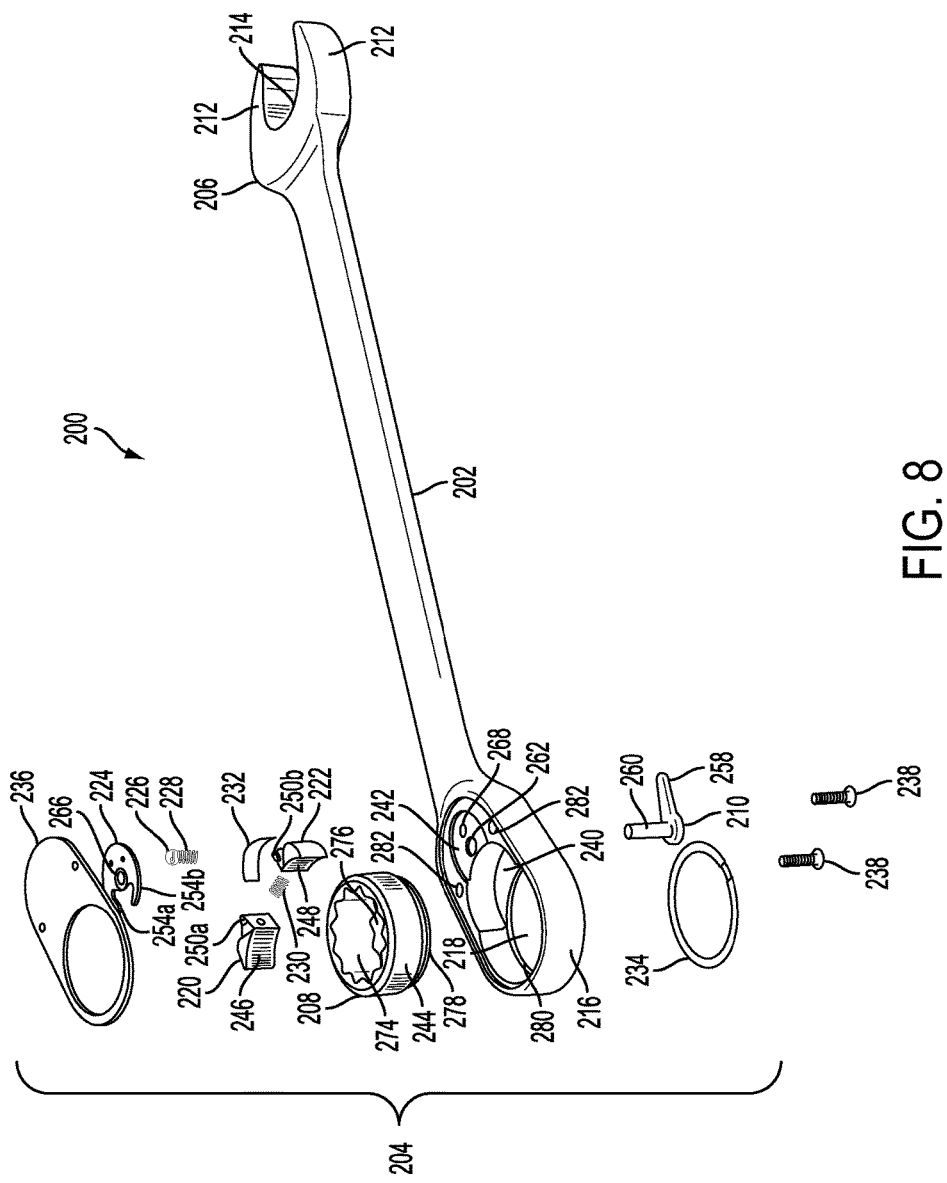
FIG. 8 is an exploded, perspective view of the ratchet wrench of FIG. 7.
Figure 9:
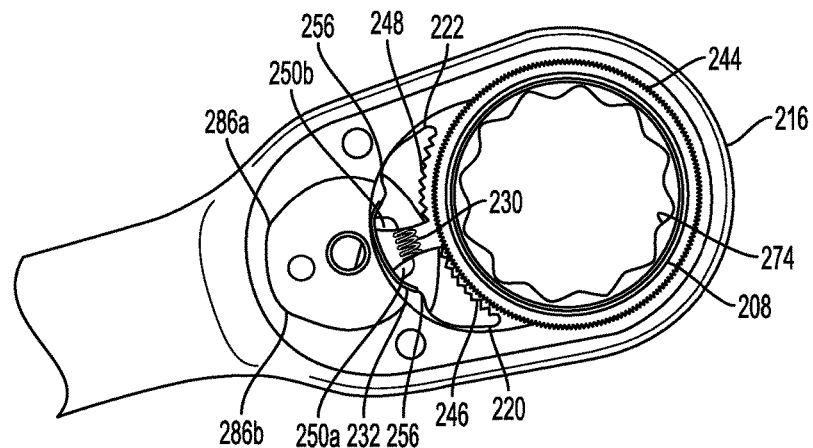
FIG. 9 is a first plan view of the ratchet wrench of FIG. 7, with a cover plate removed.

Referring to FIGS. 8 and 9, the head portion 216 includes the aperture 218, a first cavity 240 adjacent to and communicating with the aperture 216, and a second cavity 242 adjacent to and communicating with the first cavity 240. The pawls 220 and 222 are disposed in the first cavity 240 to allow the pawls 220 and 222 to selectively move into and out of engagement with the ratchet gearing or teeth 244 of the ratchet gear 208. The pawls 220 and 222 include teeth 246 and 248, respectively, adapted to matingly engage the ratchet gearing or teeth 244 of the ratchet gear 208 to allow torque to be applied in a selected direction. Each of the pawls 220 and 222 includes a post 250a, 250b adapted to engage with the reversing disc 224.

Figure 10:
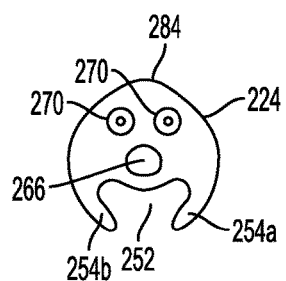
FIG. 10 is a plan view of a reversing lever disc of the ratchet wrench of FIG. 7 removed from the wrench for illustration purposes.
Figure 11:
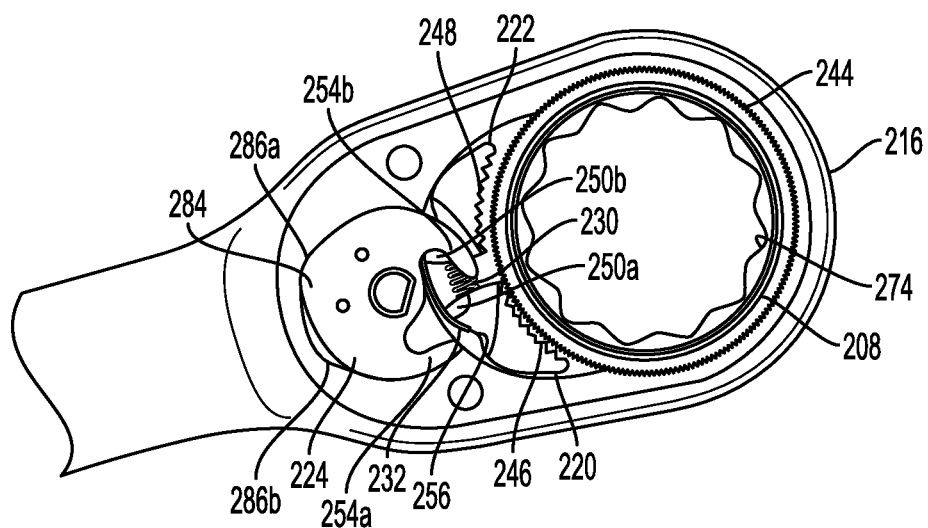
FIG. 11 is a second plan view of the ratchet wrench of FIG. 7, with the cover plate removed.

Referring to FIGS. 8 and 10-11, the reversing disc 224 is disposed in the second cavity 242. As illustrated, the second cavity 242 has a depth less than the first cavity 240, and is adjacent to and communicates with the first cavity 240 to allow the reversing disc 224 to interact with the pawls 220 and 222. Referring to FIGS. 8 and 10, the reversing disc 224 includes an arcuate opening 252 defining disc hooks 254a and 254b adapted to respectively engage the posts 250a and 250b. Referring to FIG. 11, as the reversing disc 224 is shifted to one position for a selected drive direction, a first hook 254b engages a first post 250b of, for example, the pawl 222, and continued rotation of the reversing disc 224 draws the pawl 222 away from and out of engagement with the ratchet gear 208. At the same time, a second hook 254a allows the post 250a to move through the opening 252 so that the pawl 220 shifts and becomes engaged with the ratchet gear 208.

Referring to FIGS. 8, 9 and 11, the posts 250a, 250b of the pawls 220 and 222 are proximate an opening of the first cavity 240 and oriented to face in a direction of the cover plate 236 or bottom of the head portion 216. This allows the depth of the second cavity 242 that receives the reversing disc 224 to be minimized, i.e. to be only deep enough to accommodate the reversing disc 224. Minimizing the depth of the second cavity 242 stiffens the head portion 216 improving the strength, rigidity, and the fatigue life of the tool 200.

A bias member, such as the first spring 230, may also be disposed between the pawls 220 and 222. The ends of the first spring 230 are received and retained by a bore formed in a side of each pawl 220 and 222, the respective bores of the two pawls 220 and 222 being in an opposed orientation to allow the first spring 230 to bias the pawls 220 and 222 away from each other while also ensure that only one of the pawls 220 and 222 is in engagement with the ratchet gear 208 at one time. In this manner, when the reversing disc 224 engages a selector post 250a or 250b of one of the pawls 220 and 222 to move the pawl, the spring 230 causes the other pawl to shift position into engagement with the ratchet gear 208. Additionally, the spring 230 allows the pawl engaged with the ratchet gear 208 to cam or deflect away from the ratchet gear 208 when a first drive direction is selected but the ratchet tool is rotated in reverse, in an opposite direction, to allow slippage or ratcheting in that direction. The spring 230 then forces the pawl to return to engagement with the ratchet gear 208 when the reverse movement ceases.

A second bias member, such as the second spring 232, may also be provided as a means to limit pawl travel during ratcheting or use of the tool 200. Referring to FIGS. 8 and 9, the second spring 232 is disposed in the first cavity 240 and in engagement with relief portions 256 of the pawls 220 and 222. The second spring 232 biases the pawls 220 and 222 in a direction toward the ratchet gear 208 and restricts travel of the pawls 220 and 222 during a ratcheting operation. This also increases the minimum ratchet travel between loading.

Figure 12:
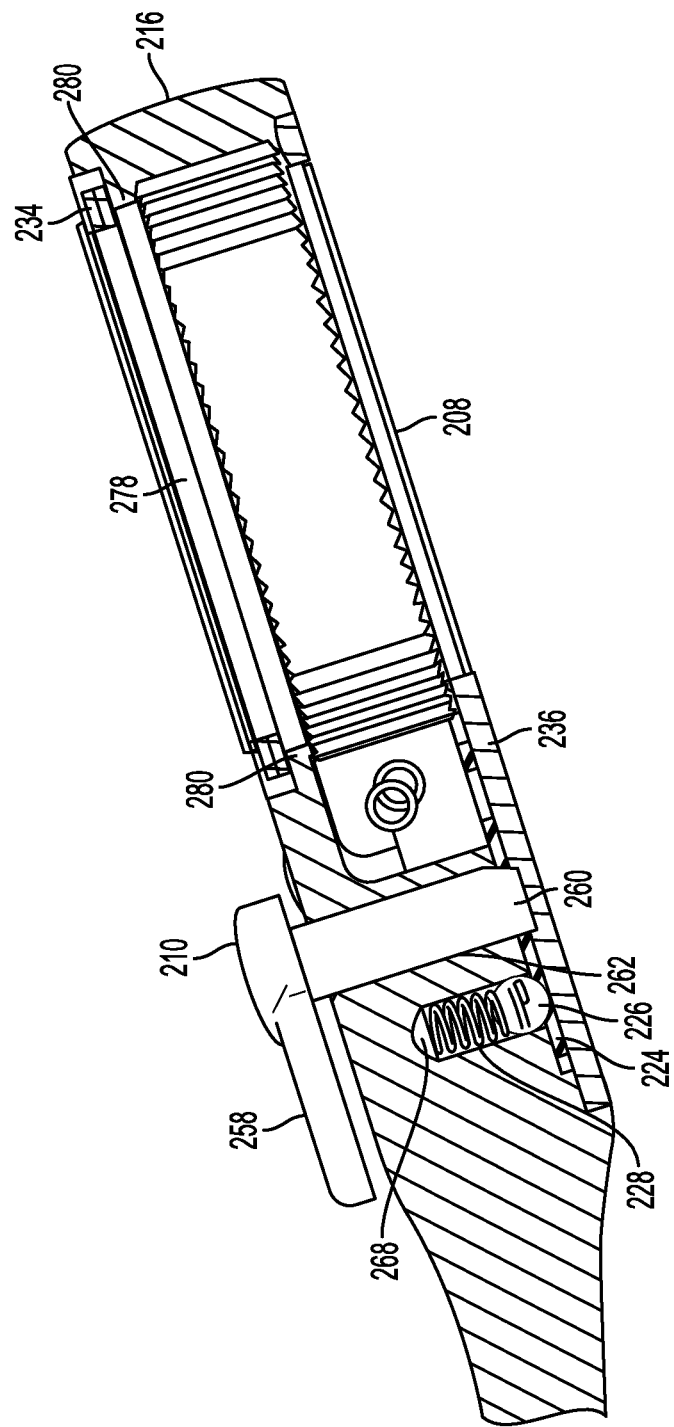
FIG. 12 is an enlarged, cross-sectional view of the ratchet wrench of FIG. 7 taken along line 12-12 of FIG. 7.

Referring to FIGS. 8 and 12, the reversing lever 210 and reversing disc 224 allow for selective engagement and dis-engagement of the pawls 220 and 222 with the ratchet gear 208. The reversing lever 210 includes a lever portion 258 and a stem portion 260. The stem portion 260 is received in a throughbore 262 provided in the head portion 216 with the lever portion 258 positioned on an outside of the head portion 216 for manual operation by a user to select a drive direction.

Referring to FIGS. 8, 10 and 12, the reversing disc 224 has an irregular bore 266, and the stem portion 260 has at least a portion with a complementary shape. In this manner, when the stem portion 260 is received in the bore 266, it is keyed to the reversing disc 224 to allow the reversing lever 210 and the reversing disc 224 to co-rotate when the reversing lever 210 is moved between positions for selecting the drive direction.

Referring to FIGS. 8 and 12, a ball and detent structure is provided to assist in holding the reversing disc 224 in place. In this aspect, a blind bore 268 is located in the second cavity 242. The spring 228 is disposed in the bore 268 and the ball 226 is disposed on the spring 228, proximate an opening of the bore 268. As illustrated in FIG. 10, the reversing disc 224 includes corresponding first and second detents or bores 270 on a side of the reversing disc 224 facing the second cavity 242. The detents 270 are positioned to correspond to the proper position for the ball 226 when the reversing lever 210 is in the proper position for the first and second drive directions, respectively. Referring to FIGS. 10 and 12, as the reversing lever 210 is rotated out of a position for a drive direction, the ball 226 contacts an edge of one of the detents 270, thereby being deflected downward by compression of the spring 228. When the reversing lever 210 is shifted to the proper position for a drive direction, the ball 226 shifts into alignment with one of the detents 270, and the spring 228 biases the ball 226 into the detent 270.

In an embodiment, referring to FIGS. 9-11, a stop mechanism is provided by structure formed on the reversing disc 224 and by the shape of the cavity 242 to prevent over rotation of the reversing disc 224. The reversing disc 224 has a non-circular shape forming a tab portion 284 that extends from a radial side and, the cavity 242 includes first and second stops 286a, 286b formed by the non-circular shape of the cavity 242. Referring to FIG. 11, rotation of the reversing disc 224 to a first position for a first drive direction results in the tab portion 284 contacting a first stop 286a, and rotation of the reversing disc 224 from the first position to a second position for a second drive direction results in the tab portion 284 shifting to a second stop 286b. The interaction between the stops 286a, 286b and the reversing disc 224 prevent over rotation of the reversing lever 210.

Referring to FIGS. 8 and 12, the ratchet gear 208 has a generally circular body portion with ratchet gearing or teeth 244 on an outer circumferential surface, and engagement surfaces 274 surrounding a receiving portion or receiving aperture 276 adapted to operatively engage a working piece. The ratchet gear 208 also includes a ring groove 278 proximal to an end of the ratchet gear and adapted to receive the retaining ring 234. The ratchet gear 208 is disposed in the aperture 218, with the ring groove 278 extending past a retaining web or shoulder 280 in the aperture 218 and the ratchet gearing or teeth 244 remaining in the aperture 218. In this aspect, the retaining web 280 and retaining ring 234 cooperatively hold the ratchet gear 208 in the aperture 218. The tool 200 traps the ratchet gear 208 with the retaining web 280 and retaining ring 234 to prevent the ratchet gear 208 from applying a load to the cover plate 236 and fasteners 238 during use.

Referring to FIG. 8, the tool 200 may be assembled by disposing the ratchet gear 208 in the aperture 218, with the ring groove 278 extending planarly beyond the retaining web 280. The retaining ring 234 is disposed in the ring groove 278 to hold the ratchet gear 208 in the aperture 218. The pawls 220 and 222 are disposed in the first cavity 240, with the teeth 246 and 248, respectively, facing in a direction of the ratchet gear 208. The spring 230 is disposed between the pawls 220 and 222 to bias the pawls 220 and 222 apart. The second spring 232 is also disposed in the first cavity 240 and engaged with the relief portions 256 of the pawls 220 and 222 to limit pawl travel during ratcheting or use of the tool 200.

The reversing lever 210 is disposed in the throughbore 262, with the stem portion 260 extending into the second cavity 242 and the lever portion 258 remaining on an exterior surface of the tool 200. The spring 228 and the ball 226 are inserted into the blind bore 268 in the second cavity 242, with the ball 226 proximate the opening of the blind bore 268. The reversing disc 224 is then positioned in the second cavity 242 and assembled onto the stem portion 260. The reversing disc 224 is rotated and a hook 254a or 254b is disposed around one of the pawl posts 250a or 250b, and with the tab portion 284 (illustrated in FIG. 11) adjacent one of the stops 286a, 286b. The cover plate 236 is then coupled on the tool 200 by inserting the fasteners 238 into fastener apertures 282 and coupling the fasteners 238 to the cover plate 236.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A tool having a drive end with a ratchet gear disposed therein, the tool comprising:
   first and second pawls each including pawl teeth that are selectively engageable and disengageable with the ratchet gear, and each of the pawls includes a relief portion on a side opposite the pawl teeth;
   a bias member engagable with each of the relief portions and that is adapted to limit movement of either of the first and second pawl teeth away from the ratchet gear when such pawl teeth are selectively engaged with the ratchet gear:
   a reversing lever having a stem portion with a length and including a notch formed in the stem portion; and
   a reversing disc adapted to cause the selective engagement of either of the first and second pawl teeth with the ratchet gear, the reversing disc has a channel adapted to allow the reversing disc to slide perpendicular to the length of the stem portion and into engagement with the notch and rotate onto the stem portion.

2. The tool of claim 1, wherein each of the first and second pawls includes a selector post.

3. The tool of claim 2, wherein the reversing disc is adapted to selectively engage the selector posts of the first and second pawls to cause the selective engagement and disengagement of the teeth of the first and second pawl teeth with the ratchet gear.

4. The tool of claim 1, wherein the reversing lever and the reversing disc co-rotate to cause the selective engagement and disengagement of either one of the first and second pawl teeth with the ratchet gear.

5. The tool of claim 4, wherein the reversing lever includes a lever portion and the drive end includes a recess formed on an exterior of the drive end, the recess receives the lever portion and is shaped to prevent over rotation of the reversing lever.

6. The tool of claim 1, further comprising a second bias member disposed between the first and second pawls.

7. The tool of claim 1, wherein the reversing disc includes a tab portion extending from a radial side.

8. The tool of claim 7, wherein the tab portion is adapted to engage a stop formed in the drive end to prevent over rotation of the reversing disc.

9. A tool, comprising:
   a drive end including:
      an aperture; and
      a first cavity in communication with the aperture;
   a ratchet gear disposed in the aperture and including:
      ratchet teeth circumferentially disposed on an exterior surface of the ratchet gear;
   first and second pawls disposed in the first cavity and respectively including first and second pawl teeth adapted to selectively engage the ratchet teeth;
   a first bias member disposed in the first cavity and adapted to limit movement of either of the first and second pawl teeth away from the ratchet gear when such first and second pawl teeth is selectively engaged with the ratchet teeth;
   a reversing lever having a stem portion with a length and including a notch formed in the stem portion; and
   a reversing disc adapted to cause the selective engagement of either of the first and second pawl teeth with the ratchet teeth, the reversing disc has a channel adapted to allow the reversing disc to slide perpendicular to the length of the stem portion and into engagement with the notch and rotate onto the stem portion.

10. The tool of claim 9, further comprising a second bias member disposed between the first and second pawls.

11. The tool of claim 9, wherein the reversing lever and the reversing disc co-rotate to cause the selective engagement of either of the first and second pawl teeth with the ratchet teeth.

12. The tool of claim 9, wherein the reversing disc includes a tab portion extending from a radial side and is adapted to engage a stop formed in the drive end to prevent over rotation of the reversing disc.

13. The tool of claim 9, wherein each of the first and second pawls includes a selector post oriented proximate an opening of the first cavity.

14. The tool of claim 13, wherein the reversing disc includes hooks adapted to selectively engage the selector posts of the first and second pawls to cause the selective engagement of either of the first and second pawl teeth with the ratchet teeth.

15. The ratchet tool of claim 9, wherein the first and second pawls each includes a relief portion on a side opposite the pawl teeth and the first bias member is engaged with the relief portions.

* * * * *